(12) United States Patent
Benakot et al.

(10) Patent No.: US 7,693,850 B2
(45) Date of Patent: Apr. 6, 2010

(54) METHOD AND APPARATUS FOR ADDING SUPPLEMENTAL INFORMATION TO PATRICIA TRIES

(75) Inventors: Eli Benakot, Moshav Emunim (IL); Igor Bolotin, Sunnyvale, CA (US); Levy Cohen, Santa Clara, CA (US); Yuval Levin, Sunnyvale, CA (US); Alex Rosenberg, Cupertino, CA (US); Neal Sample, Santa Cruz, CA (US)

(73) Assignee: Rightorder, Inc., San Jose, CA (US)

( * ) Notice: Subject to any disclaimer, the term of this patent is extended or adjusted under 35 U.S.C. 154(b) by 225 days.

(21) Appl. No.: 11/175,795

(22) Filed: Jul. 5, 2005

(65) Prior Publication Data
US 2006/0015516 A1    Jan. 19, 2006

Related U.S. Application Data

(60) Provisional application No. 60/588,747, filed on Jul. 19, 2004.

(51) Int. Cl.
G06F 17/00    (2006.01)
(52) U.S. Cl. ........................... 707/100; 707/103
(58) Field of Classification Search .................. 707/100
See application file for complete search history.

(56) References Cited

U.S. PATENT DOCUMENTS

| | | | |
|---|---|---|---|
| 6,175,835 B1 | 1/2001 | Shadmon | |
| 6,208,993 B1 | 3/2001 | Shadmon | |
| 6,240,418 B1 | 5/2001 | Shadmon | |
| 6,396,842 B1 | 5/2002 | Rochberger | |
| 6,502,101 B1 * | 12/2002 | Verprauskus et al. | 707/101 |
| 6,675,173 B1 | 1/2004 | Shadmon | |
| 6,792,432 B1 | 9/2004 | Kodavalla et al. | |
| 2002/0120598 A1 * | 8/2002 | Shadmon et al. | 707/1 |
| 2002/0129086 A1 * | 9/2002 | Garcia-Luna-Aceves et al. | 709/200 |
| 2002/0143747 A1 * | 10/2002 | Tal et al. | 707/3 |
| 2003/0204515 A1 * | 10/2003 | Shadmon et al. | 707/100 |
| 2004/0073870 A1 * | 4/2004 | Fuh et al. | 715/513 |
| 2004/0088332 A1 * | 5/2004 | Lee et al. | 707/200 |
| 2005/0038798 A1 | 2/2005 | Sample | |

OTHER PUBLICATIONS

"PATRICIA—Practical algorithm to retrieve information coded in alphanumeric", D. R. Morrison, J. ACM, 15 (1968) pp. 514-534.
"A Compact B-Tree", Bumbulis et al., International Conference on Management of Data and Symposium on Principles of Database Systems, Proceedings of the 2002 ACM SIGMOD Intern.
"Bit-tree, a data structure for fast file processing", David E. Ferguson. CACM, 35(6):114-120, 1992.

* cited by examiner

*Primary Examiner*—Pierre M Vital
*Assistant Examiner*—Truong V Vo
(74) *Attorney, Agent, or Firm*—Michael A. Glenn; Glenn Patent Group

(57) ABSTRACT

Method and apparatus for adding annotations to an index are disclosed. Annotation is defined as any supplemental information that may be stored in an index node in addition to the usual key and data references. Adding annotations to the index opens numerous applicative possibilities, including but not limited to, storing and retrieving aggregation, statistical, and security information pertaining to the indexed data and to the index itself.

17 Claims, 5 Drawing Sheets

US 7,693,850 B2

METHOD AND APPARATUS FOR ADDING SUPPLEMENTAL INFORMATION TO PATRICIA TRIES

CROSS REFERENCE TO RELATED APPLICATIONS

This application claims priority to U.S. provisional patent application Ser. No. 60/588,747 submitted Jul. 19, 2004, and which is incorporated herein in its entirety by this reference thereto.

BACKGROUND OF THE INVENTION

1. Technical Field

The invention relates generally to PATRICIA tries. More specifically the invention relates to the addition of special annotation nodes to the tries.

2. Discussion of the Prior Art

The Practical Algorithm To Retrieve Information Coded In Alphanumeric, or PATRICIA, is a trie shown by D. R. Morrison, in 1968. It is well known in the industry as a compact way for indexing and is commonly used in databases, as well as in networking technologies. In a PATRICIA implementation, trie nodes that have only one child are eliminated. The remaining nodes are labeled with a character position number that indicates the nodes' depth in the uncompressed trie. FIG. 1 shows an example of such an implementation of a PATRICIA trie for an alphabetical case. The words to be stored are "greenbeans", "greentea", "grass", "corn", and "cow". The first three words differ from the last two words in the first letter, i.e. three begin with the letter "g" while the other two begin with the letter "c". Hence, there is a difference at the first position. Therefore, there is a node at depth '0' separating the "g" words from the "c" words.

Moving on the "g" side, the next time a difference is found is in the third position where two words have an "e" while one word has an "a". Therefore, a node at that level will indicate a depth level of '2'.

Continuing down the left path reveals that the next time a different letter is found is at the sixth position where one word has a "b" while the other has a "t". Therefore, there is a node at depth '5'.

The problem with this implementation is that keys are no longer uniquely specified by the search path, and hence the key itself has to be stored in the appropriate leaf. An advantage of this PATRICIA implementation is that only about s*n bits of storage are required, where s is the size of the alphabet and n is the number of leaves.

An alphabet is a group of symbols, where the size of an alphabet is determined by the number of symbols in the group. That is, an alphabet having an s=2 is a binary alphabet having only two symbols, possibly '0' and '1' FIG. 2 shows an implementation for such an alphabet. A binary alphabet makes it possible to overcome the restriction of storing only the string values in a trie because other data types may be represented as a string of bits.

A PATRICIA trie is either a leaf L(k) containing a key k or a node N(d, l, r) containing a bit offset d≧0 along with a left sub-tree l, and a right sub-tree r. This is a recursive description of the nodes of a PATRICIA tree, and leaves descending from a node N(d, l, r) must agree on the first d−1 bits. A description of PATRICIA tries may be found in Bumbulis, Bowman, A Compact B-Tree, Proceedings of the 2002 ACM SIGMOD international conference on management of data, pages 533-541, which document is incorporated herein in its entirety.

Using the PATRICIA trie architecture, a block of references may be prepared that points to the data stored in a permanent storage, for example disk-based data tables. A prefix-based PATRICIA trie structure may be used for expressing hierarchical relations between the data elements. Given sample hierarchies A→B→C, A→B→D, E→F→G, and E→F→H one may construct compound keys by concatenating the keys of the respective elements A∥B∥C, A∥B∥D, E∥F∥G and E∥F∥H. Inserting the resulting compound keys in a PATRICIA trie produces a trie that reflects the hierarchy of the original data elements as depicted in FIG. 3.

It would be therefore beneficial to take advantage of the inherent hierarchical nature of the PATRICIA trie and provide a method and apparatus for the association of annotations of a particular value or function with a group of keys that belong to a hierarchy.

SUMMARY OF THE INVENTION

Method and apparatus for adding annotations to an index are disclosed. Annotation is defined as any supplemental information that may be stored in an index node in addition to the usual key and data references. Adding annotations to the index opens numerous applicative possibilities, including but not limited to, storing and retrieving aggregation, statistical, and security information pertaining to the indexed data and to the index itself.

DETAILED DESCRIPTION OF THE INVENTION

The invention comprehends the inherent hierarchical nature of PATRICIA tries and the desire to associate additional information with the keys belonging to varying hierarchy levels. The invention herein disclosed adds a specialized node-type to a PATRICIA trie implementation that may optionally belong to a regular index node. The specialized node is also referred to as an "annotation node" or an "annotation". The annotation node may contain a value, a programmatic function, or both. The annotation node is labeled identifying it as such. A standard traversal algorithm may be modified to be made aware of the existence of annotation nodes. The modified traversal algorithm is further made capable of reading and/or updating the values, or executing programmatic functions, contained in the annotation nodes.

Figure 1:
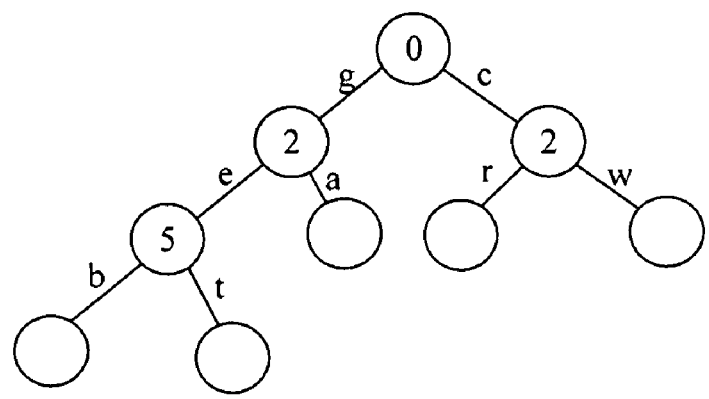
FIG. 1 shows a PATRICIA trie for an alphabetical case (prior art)
Figure 2:
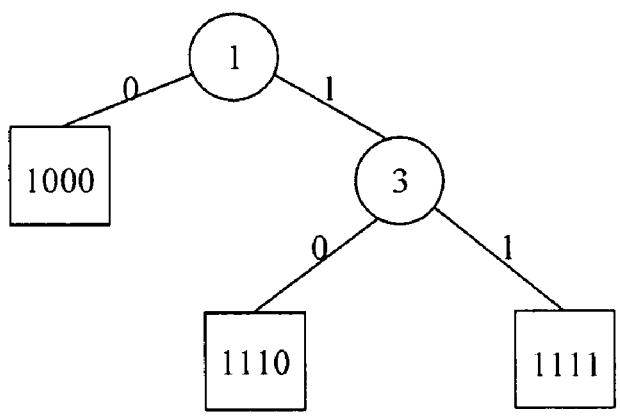
FIG. 2 shows a PATRICIA trie for a numerical case (prior art)
Figure 3:
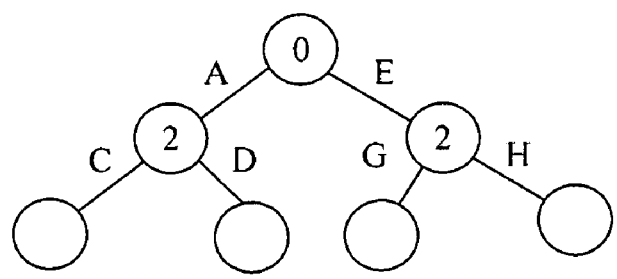
FIG. 3 shows a hierarchical PATRICIA trie (prior art)
Figure 4:
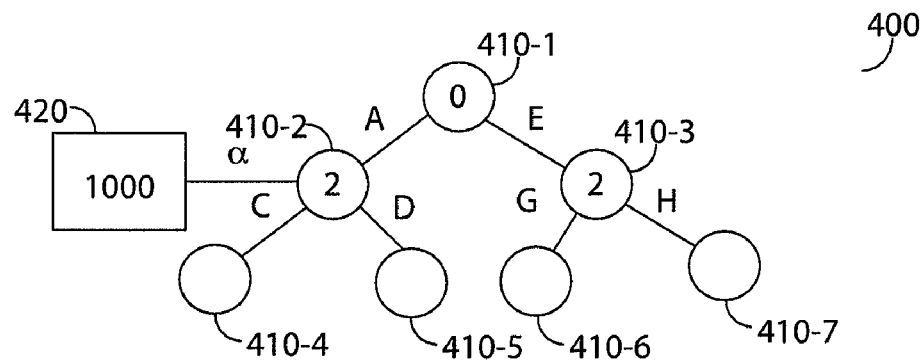
FIG. 4 shows a hierarchical PATRICIA trie with an annotation node according to the invention.

FIG. 4 shows an exemplary and non-limiting PATRICIA hierarchical trie 400, comprised of a plurality of PATRICIA nodes 410, and further having an annotation node 420 with an attachment labeled α to PATRICIA node 410-2. While a single annotation node 420 is shown, it should be understood that the annotation node 420 may be an inner node labeled as an annotation and may also contain leaf annotation nodes. This has an advantage because one leaf may be used for a function and the other leaf for storing the return value of the function. In one embodiment of the invention, the annotation nodes comprise a PATRICIA trie. An annotation node belongs to the index node to which it is attached and all the descendants of the index node. Subsequently, it may store the information related either to the attaching node or to all of its descendants. There may be more than one annotation node attached to an index node. Annotations may contain actual data or pointers to external data tables.

By way of a non-limiting example, an annotation node may contain an aggregation value pertaining to the data in the descendant nodes. For example, the index is built over the customer IDs and order numbers, and incorporates pointers to the data tables with the order details. The key structure is a result of the concatenation of a Customer ID and an Order Number. It is possible to query such an index for all the orders of a customer and, by following the data references, retrieve all the customer order records. If the application requires finding the total value of all the customer orders, this value may be obtained by retrieving all the relevant order records and post-processing the result set by reading the corresponding field of the order records and summing up the obtained values. The speed of execution of such a query depends, among other factors, on the number of order records matching the request and their physical location in the permanent storage. In the case where query execution time is critical, when using the disclosed invention an annotation node to the node containing customer ID and the total value of the customer orders is stored therein.

Figure 5:
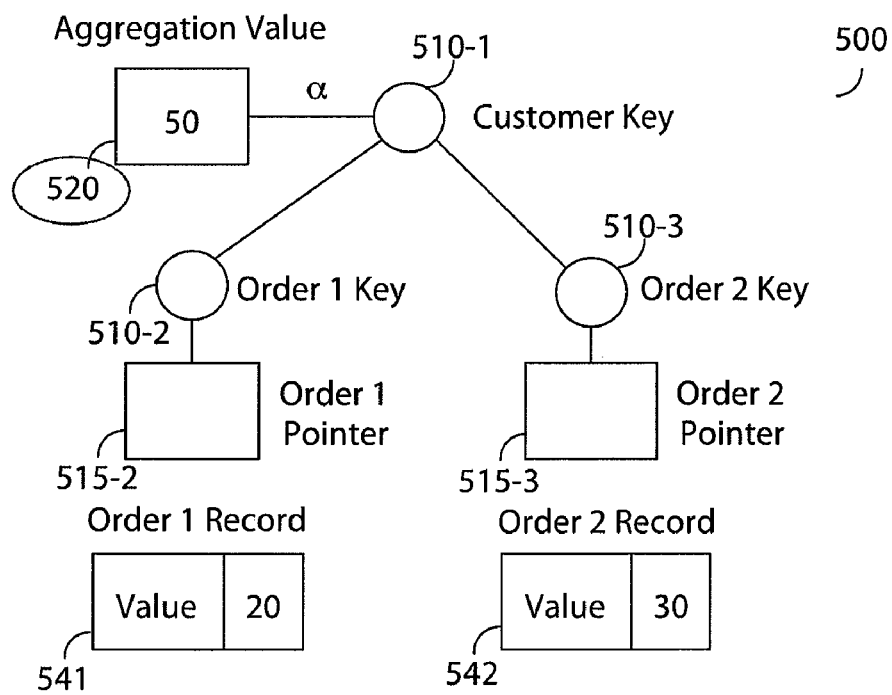
FIG. 5 shows a PATRICIA trie with annotation containing an aggregation value according to the invention.

FIG. 5 depicts an exemplary and non-limiting structure 500 of such an index with attached annotation nodes, for example the annotation node 520. The structure 500 may be a portion of a trie, for example a PATRICIA trie, containing all the information pertaining to customer orders. The annotation node 520 contains the aggregate value of the orders of the customer having the customer key in the node 510-1. When a first order 541 of a customer having the customer key 510-1 is inserted in the data tables, the index 510-2 is updated with a pointer 515-2 to the order 541. The value of the order is added to annotation node 520, resulting in an initial value of "20" (not shown). In a subsequent order, for example the order 542, a similar process takes place for the node 510-3, followed by adding the value of order 542 to annotation node 520, which will now contain the value "50" resulting from adding the previous order 541's value of "20" to the current order 542 value of "30". Traversal of the trie during a query reaches the customer node, for example the node 510-1, reads the value of the annotation, for example the annotation node 520, and returns this value without further traversal to order keys, for example the order keys 510-2 and 510-3, down the trie. The query returns the total value of the customer orders without reading the data tables and performing the post-processing of the result set. Furthermore, the query execution time decreases and is not dependent on the number of records in the result set and their physical location.

It would be advantageous to have annotation nodes, such as for example the annotation node 520, for values commonly required when presenting a query and where the search time and/or processing benefit is substantial. A person skilled in the art would recognize that the aggregation value maintained by an annotation node may include, but is not limited to, statistical measures, such as storing sums, averages, standard deviations and counts of the values pertaining to the records, at and below the position of the annotation node in the trie.

In yet another non-limiting example, the annotation node may contain a value pertaining to the index usage statistics. In this scenario, an annotation node contains a counter tracking the number of index accesses. An annotation node attached to the root node of the index may record the number of accesses to the index as a whole. Index usage statistics on the index level enable database monitoring and management applications. They also enable database administrators to render a judgment about usefulness of the index. Rarely accessible indexes may then be dropped to conserve the index storage space and eliminate the cost of index maintenance. Index usage statistics kept in the annotation nodes attached to the particular levels of the trie branches reflect the indexed data usage, as well. Recording data accesses in the annotation nodes enables numerous possibilities, such as enablement of information life cycle management (ILM) policies. For example, aged and rarely accessible data may be identified and moved to a secondary permanent storage. Additionally, index contents and structure statistics may be stored in an annotation node attached to the root node of the index. This information may be used by cost-based query optimizers. These are used in database systems and serve as an input to the costing algorithms.

Figure 6:
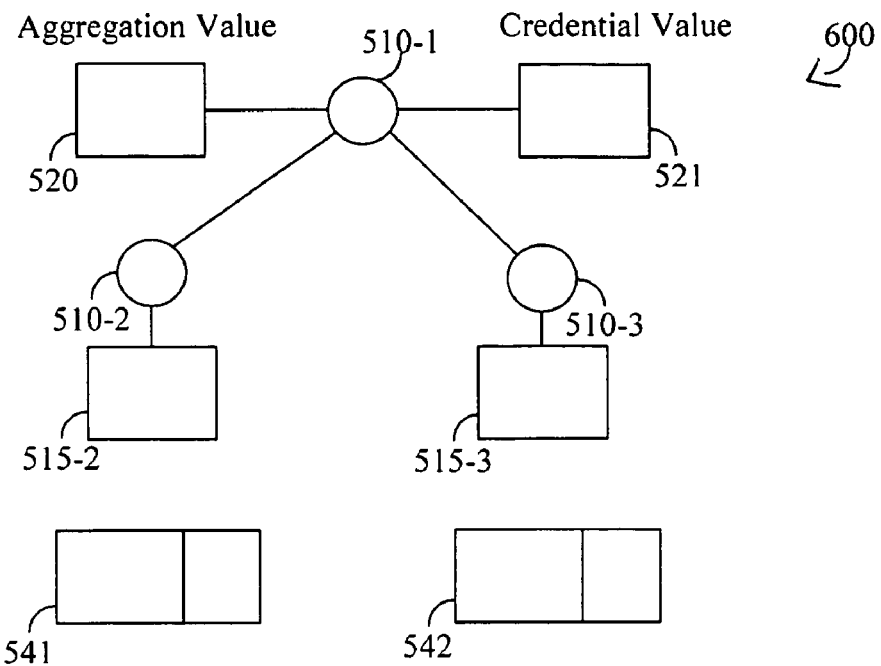
FIG. 6 shows a PATRICIA trie with annotation for security checks according to the invention.
Figure 7:
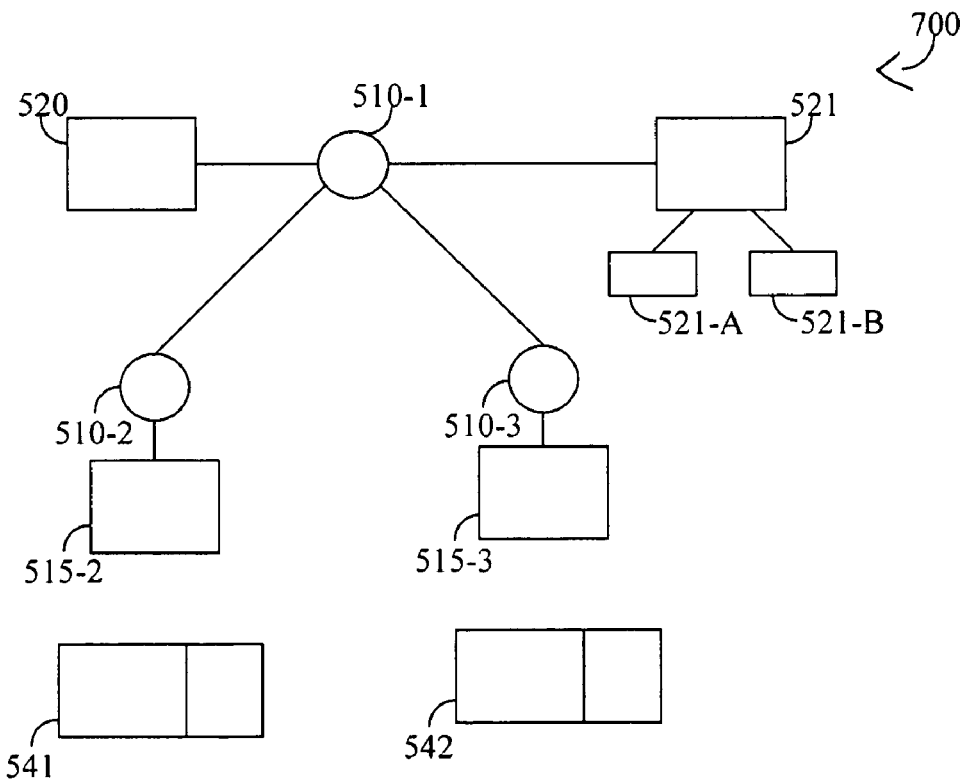
FIG. 7 shows a PATRICIA trie with an annotation node having leaf annotation nodes

In another non-limiting example, an annotation node may contain a value and function pertaining to the data security. FIG. 6 shows an exemplary and non-liming structure 600 implemented in accordance with the disclosed invention. The structure 600 is based on the aforementioned example of the index structure 500 containing Customer IDs and Order Numbers, for example a customer key 510-1, and order numbers 510-2 and 510-3, respectively. An annotation node to the node 510-1, for example the annotation node 521, and the credentials of the users eligible to access the orders of that customer are stored. In a data access authorization scenario, the index traversal routine is provided with the credentials of the user performing the access. At the point in the traversal where the node 510-1 is accessed, a comparison of the supplied credentials to the credentials stored in the annotation node, for example the annotation node 521, is performed. In case of a match, i.e. the user attempting an access has sufficient credentials to enter the data of the structure 600, the traversal continues down the trie to the order keys, for example the order keys 510-1 and 510-2, with subsequent retrieval of the order records, for example the records 541 and 542. However, in case of a mismatch, i.e. the credentials of the user attempting to access the customer data, for example the customer in the node 510-1, are insufficient, traversal terminates, and the access to the order records is not permitted. In a related data security scenario of data access audit enablement, shown with reference to FIG. 7, an annotation node 521, attached to the customer node 510-1, the annotation node 521 having, for example, two attached annotation leaf nodes 521-A and 521-B, is provided. The annotation leaf node 521-A may contain a pointer to the data access record, while the leaf node 521-B may contain a function for operation on the data access record. For every data access to the order records through node 510-1, the user ID attempting to access through the node 510-1, and other information including, but not limited to, a timestamp, may be written into a data access record by executing the logging function contained in the leaf annotation node 521-B.

In another non-limiting embodiment of the disclosed invention, an annotation node may contain a value related to the information used in routing applications. For example, a computer system deployed in a distributed fashion on a plurality of computers, essentially comprising a network, may consist of multiple sub-networks, each sub-network consisting of computers of varying capabilities and, possibly, geographically dispersed. Such a system requires routing of the request for the system functions to the appropriate sub-networks and computers. It is a known practice to employ tries to represent the routing tables containing computer addresses. The invention attaches an annotation to an index node that contains, for example, network identification (ID). The annotation node contains information enabling conditional routing of the requests to the sub-networks. These conditions may be related to geographical locations of the client issuing the request and the sub-networks where the request is routed to the nearest sub-network. Additionally, the conditions may include routing priority information enabling fulfillment of the service level agreement (SLA), where the client requests are routed to the high-availability sub-networks for the high-priority requests. Yet, other conditions may be related to the load-balancing of the requests based on the expected loads on the sub-networks during, for example, a twenty-four hour operational cycle.

Figure 8:
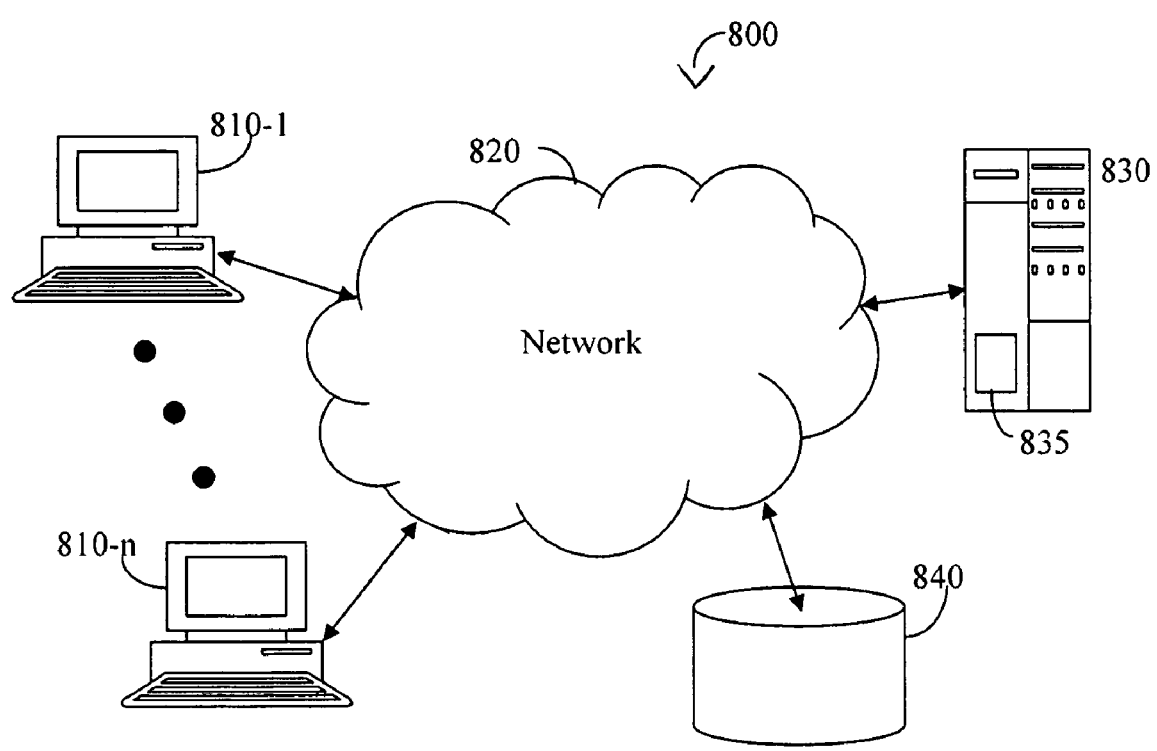
FIG. 8 shows a schematic block-diagram of a system containing a PATRICIA trie with an annotation node according to the invention.

A trie including a structure such as one of structures 500, 600, or 700, is implemented as part of a whole system. FIG. 8 illustrates an exemplary and non-limiting computer network 800 having access to a database system. The network comprises a plurality of access endpoints 810, including but not limited to personal computers (PCs), workstations (WSs), personal digital assistants (PDAs), and other means of network accessing devices that are, capable of or have a need to access a database. The devices are connected to a network 820, which is shown as a simple network for the purposes of clarity. However, the network 820 may be any of a local area network (LAN), wide area network (WAN), wireless network, and other types of networks, as well as all combinations thereof. Connected to the network 820 is a server 830 containing at least a database management system (DBMS) 835, comprising at least an index structure, including but not limited to a PATRICIA trie, where at least one of the PATRICIA trie nodes has at least one attached annotation node, all of which are operative in accordance with the disclosed invention. A storage system 840 is connected to the system 800 to handle the large amount of data normally associated with a database. The storage system 840 may be, but is not limited to, a local means of storage, including, but not limited to, a part of the server 830, a geographically distributed storage system, or any combination thereof. A database system to access the data in the database, configured with an index structure with annotation nodes implemented in accordance with the disclosed invention, enjoys the benefits of the invention disclosed herein, including significant performance improvement over prior art solutions.

Figure 9:
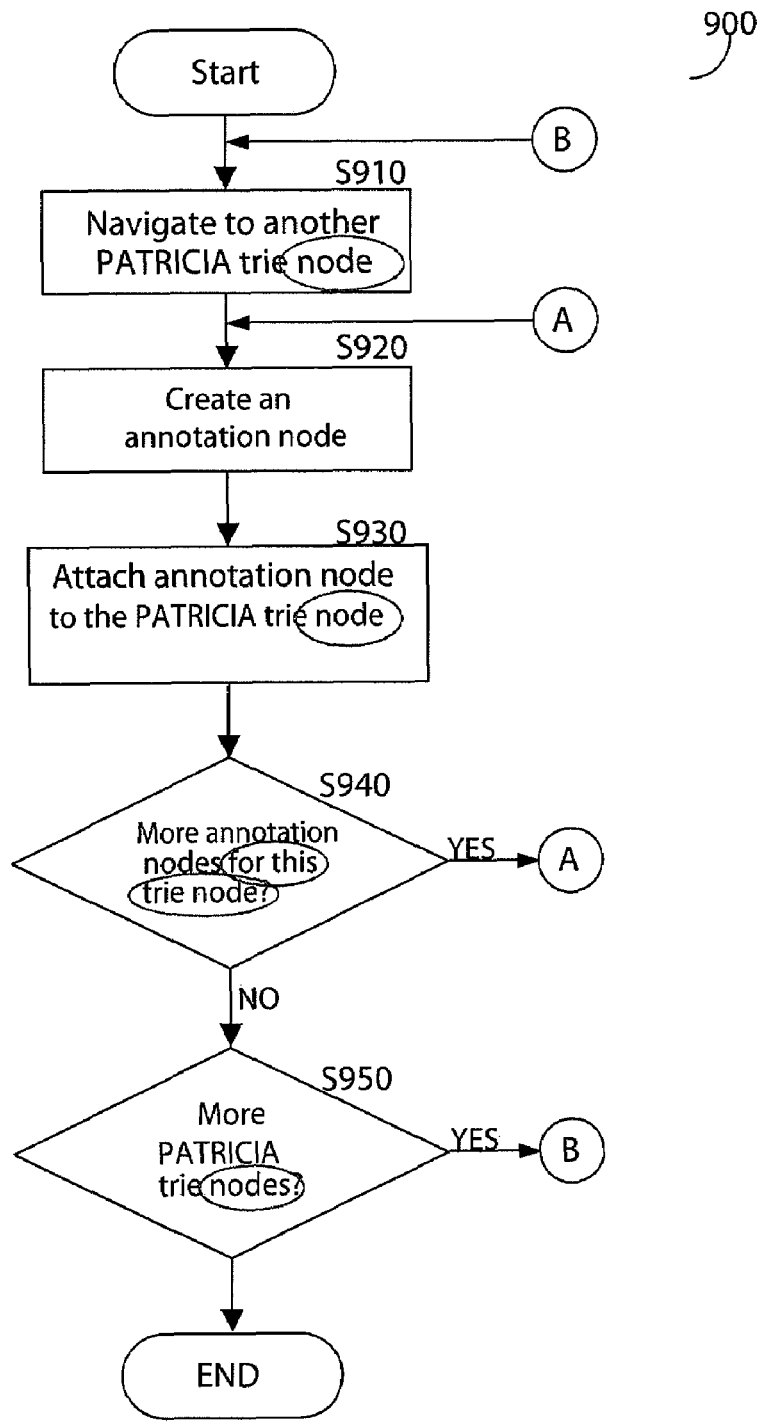
FIG. 9 is a flowchart showing the attaching of an annotation node to a PATRICIA trie node according to the invention.

FIG. 9 shows an exemplary and non-limiting flowchart 900 for attaching an annotation node to a PATRICIA trie node. In step S910, the next PATRICIA trie node, for example node 510-1 is selected. In step S920, an annotation node, for example annotation node 520, is created, and placed in memory, for example in storage system 840 of system 800. In step S930 the annotation node created in step S920 is attached to its respective PATRICIA trie node. For example, the annotation node 520 is attached to node 510-1 by means of link α as further explained in more detail above. In step S940, it is checked whether it is necessary to add additional annotation nodes, for example an annotation node 521, to the selected trie node, for example the node 510-1. If affirmative, then execution continues with step S920. Otherwise, execution continues with step S950. In step S950, it is checked whether an additional PATRICIA trie node requires an annotation node and, if affirmative, execution continues with step S910. Otherwise, execution terminates.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A data management system comprising:
   a processor;
   a memory device containing a trie used to store an associative array, said trie comprising:
      at least one trie node, said trie node comprising a PATRICIA node of a PATRICIA node structure; and
      at least one annotation node added to an index node of said PATRICIA node structure, wherein said annotation node is attached by a link to said index node, wherein said annotation node provides annotation relevant to said index node to which it is attached and relevant to all descendents of said index node;
   wherein said annotation node further comprises an identification label, which indicates that said annotation node contains an annotation to said trie node, wherein said annotation contain actual data or pointers to external data tables, and wherein said annotation node comprises any of:
      a statistical value;
      security data;
      an aggregation value;
      routing information; and
      a programmatic function;
   wherein attachment via said link of said annotation node to said PATRICIA node structure leaves said PATRICIA node structure unchanged, wherein said annotation node includes information about said index node to which it is attached and to all nodes descendant from said index node, such that said annotation does not need to be reiterated at each link; and
   wherein said trie node functions in a data management system, said data management system comprising said trie, said data management system incorporated into a network, wherein said network comprises any of: a computer, a workstation, a local area network, and a personal data assistance.

2. The data management system of claim 1, said aggregation value relating to descendant nodes of the PATRICIA node to which said annotation node is attached.

3. The data management system of claim 1, said programmatic function enabling the execution of a sequence of steps that operate on any of:
   a value, a programmatic function, a descendant trie node, and an annotation node.

4. The data management system of claim 1 further comprising a router coupled with said processor, wherein said router routes information from the data management system to at least one remote computer over a network, and wherein said annotation node comprises a network identification tag for enabling conditional routing of the requests to the sub-networks.

5. A method for creating a trie, comprising the steps of:
   using a processor for accessing a memory device containing a PATRICIA trie node structure used to store an associative array;
   navigating to a PATRICIA trie node within said PATRICIA node structure;

creating at least one annotation node, said annotation node includes information about one or more trie nodes descendant from said PATRICIA trie node; and adding said at least one annotation node to said PATRICIA trie node, wherein said annotation node is attached by a link to an index node of said PATRICIA node structure, wherein said annotation node provides annotation relevant to said index node to which it is attached and relevant to all descendent nodes of said index node;

wherein said annotation node further comprises an identification label, which indicates that said annotation node contains an annotation to said trie node, wherein said annotation contain actual data or pointers to external data tables, the method further comprising any of the steps of:

adding a programmatic function to said annotation node or operating on such a programmatic function; and adding an annotation node to said annotation node or operating on such an added annotation node;

adding or operating on a statistical value;

adding or operating on security data;

adding or operating on an aggregation value; and adding or operating on routing information; and wherein attachment via said link of said annotation node to said PATRICIA node structure leaves said PATRICIA node structure unchanged, wherein said annotation node includes information about said index node to which it is attached and to all nodes descendent from said index node, such that said annotation does not need to be reiterated at each link.

6. The method of claim 5, wherein said method is implemented as a sequence of computer instructions.

7. The method of claim 6, wherein said sequence of computer instructions is included in a computer software product.

8. The method of claim 5, further comprising the step of:
adding a label to said annotation node which indicates that said annotation node contains an annotation to said trie node.

9. The method of claim 5, said step of adding further comprising the step of:
adding or operating on a value corresponding to at least a descendant node of the PATRICIA node to which said annotation node is attached.

10. The method of claim 1, wherein said programmatic function enables execution of a sequence of at least one step that operates on at least one of:
a value, a programmatic function, a descendant trie node, and an annotation node.

11. An apparatus for efficient data search, comprising:
computing means having access to a plurality of organized data, said organized data being placed in a memory of said computing means, said organized data, being organized in a trie, and further comprising a PATRICIA trie node within a PATRICIA node structure, said PATRICIA trie node placed in the said memory;

means for placing an annotation node in said memory, wherein said annotation node includes information about all of the one or more trie nodes descendant from said PATRICIA trie node, such that said annotation does not need to be reiterated at each link;

wherein said annotation node further comprises an identification label, which indicates that said annotation node contains an annotation to said trie node, wherein said annotation contain actual data or pointers to external data tables, the apparatus comprising any of:

a means for adding a programmatic function to said annotation node or operating on such a programmatic function; and a means for adding an annotation node to said annotation node or operating on such an added annotation node;

a means for adding or operating on a statistical value;

a means for adding or operating on security data;

a means for adding or operating on an aggregation value; and a means for adding or operating on routing information; and means for adding said annotation node to a respective PATRICIA trie node, wherein said annotation node is attached by a link to an index node of said PATRICIA node structure, wherein attachment via said link of said annotation node to said PATRICIA node structure leaves said PATRICIA node structure unchanged, wherein said trie is maintained in a data management system incorporated into a network, wherein said network comprises any of: a computer, a workstation, a local area network, and a personal data assistance.

12. The apparatus of claim 11, further comprising:
means for labeling said annotation node placed in said memory as a node containing annotation information.

13. The apparatus of claim 11, further comprising:
means for generating said aggregation value from values related to at least one descendant node of a PATRICIA node to which said annotation node is attached.

14. The apparatus of claim 11, said apparatus further comprising:
means for enabling a trie traversal algorithm to read a value in said annotation node.

15. The apparatus of claim 11, further comprising:
means for enabling a trie traversal algorithm to modify a value in said annotation node.

16. The apparatus of claim 11, further comprising:
means for enabling a trie traversal algorithm to execute said programmatic function in said annotation node.

17. The apparatus of claim 11, wherein said apparatus further comprising any of:
means for storage of data;
means for inputting data to said apparatus;
means for outputting data from said apparatus; and
means for connecting a plurality of elements comprising said apparatus.

\* \* \* \* \*